US005536086A

United States Patent [19]
Nattrass

[11] Patent Number: 5,536,086
[45] Date of Patent: Jul. 16, 1996

[54] REINFORCED WALL BOTTOM CLOSURE CONSTRUCTION FOR A BULK BAG

[75] Inventor: Peter J. Nattrass, Barrington Hills, Ill.

[73] Assignee: Bulk Lift International Incorporated, Carpentersville, Ill.

[21] Appl. No.: 453,678

[22] Filed: May 30, 1995

[51] Int. Cl.⁶ .................. B65D 33/36; B65D 33/38
[52] U.S. Cl. .................. 383/67; 383/24; 383/41
[58] Field of Search .................. 383/41, 67, 24; 222/181.3

[56] References Cited

U.S. PATENT DOCUMENTS

| | | | |
|---|---|---|---|
| 3,789,897 | 2/1974 | Saito | 383/67 |
| 3,961,655 | 6/1976 | Nattrass et al. | 383/67 |
| 4,194,652 | 3/1980 | Williamson et al. | 383/67 |
| 4,364,424 | 12/1982 | Nattrass | 383/67 |
| 4,646,357 | 2/1987 | Nattrass | 222/181.3 |
| 4,917,266 | 4/1990 | Kellenberger et al. | 383/67 |
| 5,340,218 | 8/1994 | Cuthbertson | 222/181.3 |
| 5,423,611 | 6/1995 | Sherrard | 383/24 |

*Primary Examiner*—Stephen P. Garbe
*Attorney, Agent, or Firm*—Dorn, McEachran, Jambor & Keating

[57] ABSTRACT

A reusable discharge closure construction for the bottom wall of a bulk bag having a large outlet opening of diameter D includes an inner flexible discharge tube having a diameter at least as large as D and a short, flexible outer closure tube which has an effective length less than the opening radius D/2. There is a support ring strong, heavy webbing having a diameter at least as large as D; one end edge of the support ring is sewn to the bottom wall of the bulk bag and the other end edge of the ring is sewn to the tubes. A relatively flat closure is effected by tying the discharge tube closed, stuffing it into the bag interior, and then closing the closure tube by a drawstring mounted in its outer end.

9 Claims, 4 Drawing Sheets

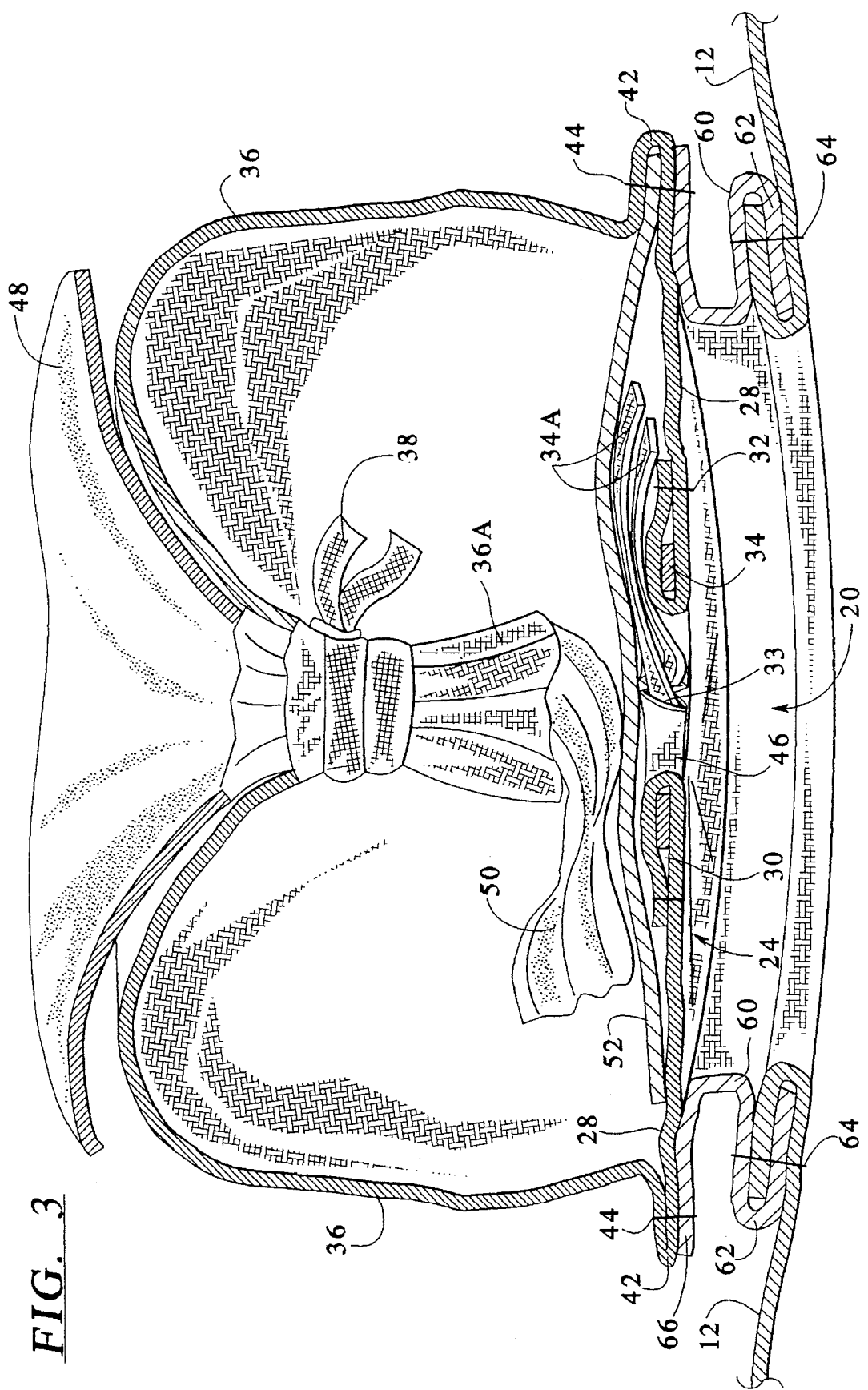

REINFORCED WALL BOTTOM CLOSURE CONSTRUCTION FOR A BULK BAG

BACKGROUND OF THE INVENTION

The use of large bags of woven fabric, called bulk bags, to transport bulk quantities of powdered or granular materials, bags which are lifted and moved by forklift trucks and other material handling equipment having hooks or tines, has become commonplace. The cloth for the bulk bags is usually woven of strong, tape-like plastic fibers (e.g., polyethylene), though natural fibers could be employed. Bulk bags of this general type are disclosed in Nattrass et al. U.S. Pat. Nos. 3,961,655 and 4,010,784, in Nattrass U.S. Pat. No. 4,307,764, and in Sandeman et al. U.S. Pat. No. 4,207,937. Persistent problems in the use of these bulk bags arise in discharge of the bulk material from the bulk bag when it has reached its destination. To avoid the necessity of turning the bulk bags upside-down to discharge their contents, the bags have sometimes been provided with bottom discharge closures.

One discharge closure is shown in FIGS. 13–18 of the aforementioned Nattrass et al. U.S. Pat. No. 3,961,655. That particular closure has the disadvantage that the closure projects outwardly of the bottom wall of the bag and may be damaged by careless handling of the bulk bag during use, with resultant loss of part or all of its contents. A relatively flat closure for a bottom discharge opening in a bulk bag is shown in FIGS. 1–12 of the same patent, but that bottom closure relies upon a loose flap that may be displaced when the bag is filled. Furthermore, that closure arrangement also has loose ties projecting outwardly of the bottom wall of the bulk bag, so that the closure could be accidentally opened at the wrong time.

A better bottom closure for a bulk bag is described and claimed in Nattrass U.S. Pat. No. 4,364,424, reissued Dec. 16, 1986 as Reissue U.S. Pat. No. Re. 32,308. The closures shown in that patent afford a relatively flat, reusable closure that protects the contents of the bulk bag through many uses. Another bulk bag closure, is not flat when closed, is shown in Manerba U.S. Pat. No. 4,221,250.

For many applications the bulk bag closures of Nattrass et al. U.S. Pat. No. Re. 32,308 are the best available. There is a definite limitation, however, on the size of the bottom opening in the bulk bag, a limitation that also restricts the rate at which the bulk bag can be emptied. As the outlet opening in a bulk bag bottom wall is enlarged, that wall is weakened. The closure itself makes up in part, but only in part, for this loss of strength. For virtually any bulk bag there is a bottom outlet size large enough so that the bulk bag will no longer pass the 5:1 strength test generally recognized as an industry standard and insisted upon by almost any sophisticated purchaser/user of bulk bags. That size is usually a bottom outlet having a maximum diameter of ten inches (25 cm) or more.

SUMMARY OF THE INVENTION

It is a primary object of the present invention, therefore, to provide a new and improved reusable discharge closure for a bulk bag such that the discharge closure is generally flat against the end wall of the bulk bag when closed and effectively precludes the passage of dust or other fine material through the closure, yet permits use of a large outlet opening for rapid emptying of the bulk bag, without weakening the bulk bag.

Another object of the invention is to provide a new and improved reusable discharge closure for a bulk material transport bag that is simple and inexpensive in construction, that will last for the full operating life of the bag, and that permits use of a large discharge opening in the bottom wall of the bulk bag without unduly weakening it.

Accordingly, the invention relates to an improved discharge closure construction for a bulk bag including a bottom wall having an outlet opening of effective diameter D, joined at the periphery of the bottom wall to a side wall structure, the walls of the bulk bag all being formed of a strong, flexible woven fabric having a given tensile strength. The improved discharge closure construction comprises a support ring of strong, heavy webbing, having a tensile strength at least twice the tensile strength of the woven fabric of the bulk bag walls and having a diameter at least as large as D, the support ring having an effective length L3. One end edge of the support ring is anchored to the periphery of the outlet opening in the bottom wall of the bag, preferably by stitching. The closure construction further comprises a bottom wall closure including a flexible discharge tube having a diameter at least as large as D and having an effective length L1 larger than L3. The discharge tube has its upper end edge secured to the lower periphery of the support ring, the discharge tube projecting downwardly from the support ring when the bottom wall closure is open.

BRIEF DESCRIPTION OF THE DRAWINGS

The invention is illustrated more or less diagrammatically in the accompanying drawings, in which:

FIG. 3 is a sectional elevation view of a bag closure like that of FIG. 2, on an enlarged scale, showing the bag closure in closed condition;

DESCRIPTION OF THE PREFERRED EMBODIMENTS

Figure 1:
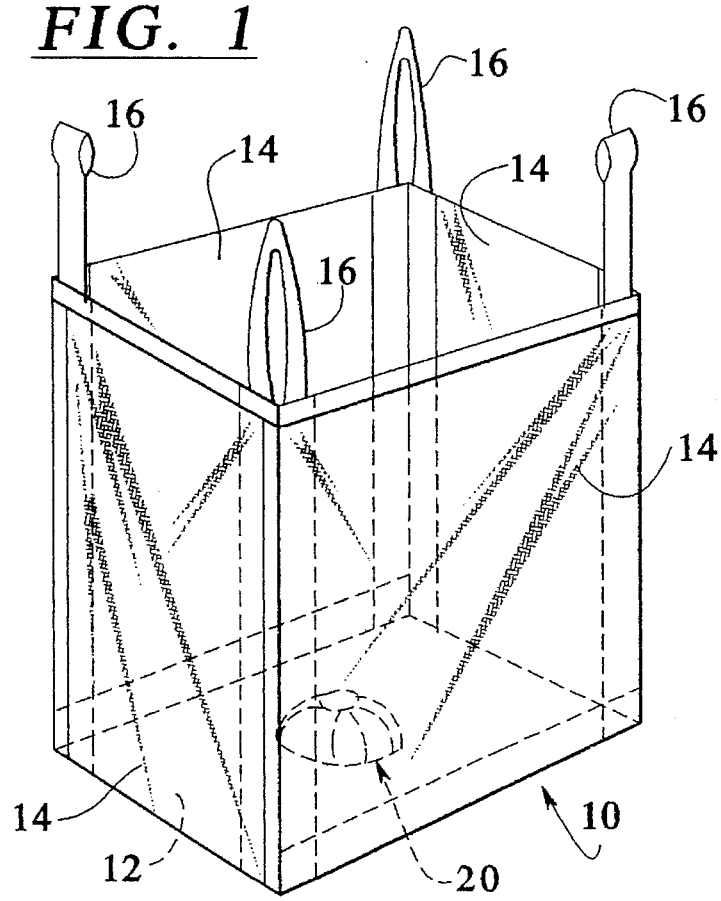
FIG. 1 is a perspective view of a bulk bag incorporating a reusable discharge closure constructed in accordance with the present invention.

FIG. 1 illustrates a bulk bag 10 that includes a reusable discharge closure 20 constructed in accordance with a preferred embodiment of the present invention. Bag 10 includes a bottom wall 12 joined to a plurality of side walls 14; walls 12 and 14 are all formed of strong, flexible cloth, preferably a plain woven cloth using polypropylene tape for both the warp and the weft. Bag 10, as shown, is of rectangular configuration with four side walls 14; other configurations can be used as desired. Bag 10 further includes four lifting and support loops 16 secured to the tops of the bag side walls 14 at the corners of the bag. Bulk bag 10 usually has an integral top wall; none has been shown. The mounting arrangement for lifting loops 16 is not critical to the invention; the mounting arrangement described in the aforesaid Nattrass U.S. Pat. No. 4,307,764 is preferred.

Figure 2:
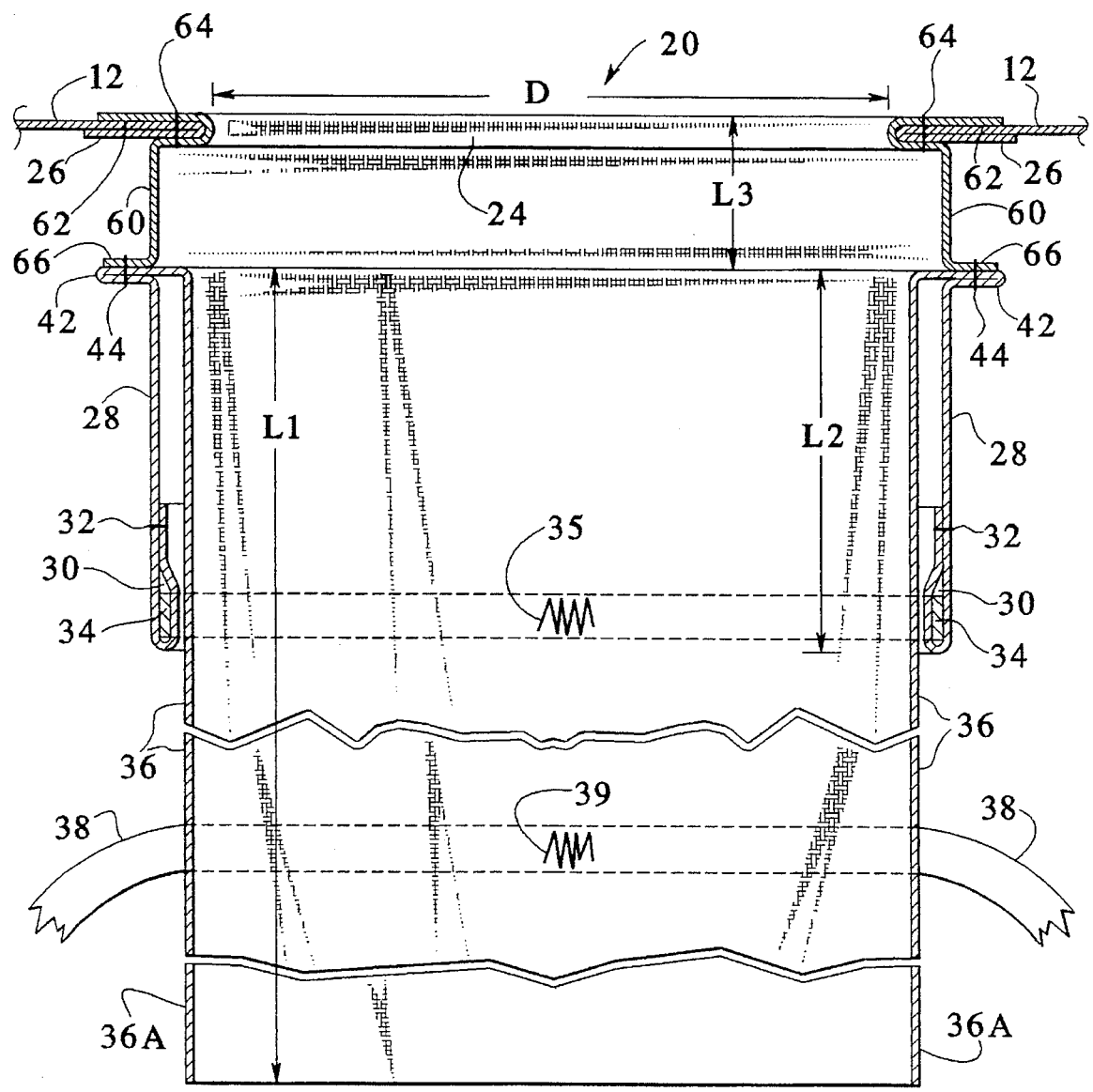
FIG. 2 is a sectional elevation view of a discharge closure constructed in accordance with a preferred embodiment of the present invention, with the closure in its open condition.

FIGS. 2 and 3 illustrate a bottom end wall discharge closure 20 constructed in accordance with a preferred embodiment of the present invention. A discharge opening 24 having an effective diameter D is cut into the central portion of the bottom end wall 12 of the bulk bag. A closure tube 28 is included in the bag closure 20; closure tube 28 is formed of a strong flexible material, comparable to the bag cloth, and has a diameter at least as large as the diameter D of discharge opening 24. Closure tube 28 extends downwardly from the bulk bag, in alignment with opening 24 in end wall 12 as explained hereinafter. The lower end of closure tube 28 is folded back upwardly to form a peripheral pocket 30, the pocket being secured by means of stitching 32. A drawstring 34, which may be a tape of strong webbing, is disposed in pocket 30; the ends 34A of drawstring 34 extend out of pocket 30 through a slit 33 as best shown in FIG. 3. Drawstring 34 may be tacked into pocket 30, as by suitable tack sewing 35 (FIG. 2), to preclude loss of the drawstring. Closure tube 28 has an effective length L2; see FIG.. 2.

Closure 20, as shown in FIG. 2, further comprises a discharge tube 36 that is also formed of a strong flexible cloth and has a diameter at least as large as the effective diameter D of end wall opening 24. Discharge tube 36 has an effective length L1 substantially greater than the effective length L2 of closure tube 28; usually, L1 is several times greater than L1. A closure tie 38 is affixed to discharge tube 36, as by tack sewing 39, preferably at a position well below the bottom edge of closure tube 28.

Closure 20, FIGS. 2 and 3, further includes a support ring 60 of strong, heavy webbing; the webbing of ring 60 should be at least two or more times greater in tensile strength than bottom wall 24 or tubes 28 and 36. Ring 60 has an overall effective length L3 (FIG. 2). Ring 60 is interposed between the bulk bag bottom wall 12 and the dual tube structure 28 and 36, as best shown in FIG. 2.

In assembling closure 20, the inner edge 26 of discharge opening 24 in the bag end wall 12 is preferably folded back on itself for purposes of reinforcement, as shown in FIG. 2. A double fold may be used; see FIG. 3. Edge 26 may be stitched to hold it in place; such stitching is not shown in FIG. 2. One edge portion 62 of support ring 60 is affixed to the inner peripheral portion 26 of bottom wall 24 by appropriate means such as one or more stitched seams 64. The other edge portion 66 of support ring 60 is sewn or otherwise affixed to the top edge portions of discharge tube 36 and closure tube 28 as by anchor stitching 44. Stitching 44 and 64 both extend around the entire periphery of opening 24. Thus, as assembled, closure tube 28, discharge tube 36, and the reinforcement, support ring 60, all project downwardly from the bulk bag end wall 12, with discharge tube 36 disposed within closure tube 28, all as shown in FIG. 2.

In the preferred constructions illustrated in FIGS. 2 and 3, closure tube 28 and discharge tube 36 are not separate individual members. Instead, these two tubes are shown as formed from a single elongated tube of strong flexible material, which may be fabricated as a true tube or as a flat length of cloth having vertical edges seamed together to afford a tube. That unitary tube is folded back into itself, the fold being identified by reference numeral 42 in FIGS. 2 and 3. The fold end 42 of the resulting dual concentric tube is sewn to the lower edge 66 of the reinforcement webbing 60 by stitching 44. This particular construction for tubes 28 and 36 is usually simpler and more economical than arrangements using individual tubes (not shown) for the discharge and closure functions; either construction may be used.

FIG. 2 shows closure 20 in its open condition. Before filling the bag, tie 38 is first wrapped tightly around discharge tube 36 and then tied, sealing off the outer end of the discharge tube. After being tied off, discharge tube 36 is stuffed back into the interior of the bag in the manner illustrated in FIG. 3. As shown in FIG. 3, with the bulk bag empty it is readily possible to move the entire discharge tube 36, including tie 38, up into the interior of the bag above end wall 12.

Drawstring 34 is then tightened and tied. The overall length L2 of closure tube 28 plus the length L3 of ring 60 is smaller than one-half the effective diameter D of discharge opening 24; accordingly, tightening and tying off drawstring 34 brings closure tube 28 to the relatively flat closed position shown in FIG. 3, with only a small opening 46 remaining at the center of closure tube 28. The free ends 34A of drawstring 34 can then be stuffed up into the interior of the bulk bag, within the confined area defined by discharge tube 36. Thus, the final closed condition for the closure shown in FIG. 3 has no part of the closure projecting appreciably beyond the level of the bottom end wall 12 of the bag.

With closure 20 in the closed condition shown in FIG. 3, the bottom of the bulk bag is effectively sealed. When the bulk bag is then filled with granular or powdered material, the initial bulged condition for discharge tube 36 shown in FIG. 3 is altered (flattened) because the contents of the bag push the discharge tube down flat along the bag bottom end wall 12. The weight of the bulk bag contents may cause closure 20 to bulge downwardly to some extent (not shown), but it remains relatively flat. The contents of the bulk bag cannot escape through discharge tube 36 as long as tie 38 is tightly tied. Furthermore, the end of discharge tube 36 is usually deflected to one side, away from the small opening 46 in closure tube 28. Closure 20 is essentially dust-tight.

After the bulk transport bag has reached its destination, discharge of the bag contents is simple and expeditious. First, the free ends 34A of drawstring 34 are pulled back through opening 46 to the outside of closure 20, the drawstring is untied, and closure tube 28 is opened up, back to the position shown in FIG. 2. It is then a simple matter to pull the end 36A of discharge tube 36 downwardly from the bag through opening 24. The lower end 36A of discharge tube 36 can then be aligned with a receiving bin or fitted over an input fitting to a storage container, after which tie 38 is untied and unwrapped. The contents of the bulk bag then empty out through support ring 60 and discharge tube 36 in a controlled manner, with minimum environmental problems. When empty, the bulk bag is ready for re-use, since all components remain in place, closure 20 being back in the condition illustrated in FIG. 2.

For some materials, particularly fine powders or granular materials accompanied by substantial quantities of dust, it is customary to use a plastic film liner for the basic bulk bag. Also, with materials of this kind, it may be desirable to provide even further protection from the loss of dust through closure 20. FIG. 3 illustrates the adaptation of the invention to this situation. The usual plastic film liner 48 comprises an integral discharge tube 50. The plastic film discharge tube 50 is pulled through the end 36A of the closure discharge tube 36 that is a part of closure 20. Thus, tie 38 serves to seal off discharge tube 50 of plastic liner 48 as well as discharge tube 36. Accordingly, no substantial modification of closure 20 is required when an inner plastic liner is used in the bulk bag.

For added dust protection, a supplemental closure member or flap 52 may be incorporated in closure 20 as shown in FIG. 3. Flap 52 may be the portion of the bottom end wall 12 of the bulk bag that was cut out to form its outlet opening 24. Flap 52 may be attached to the interior of closure tube 28, at one point, by the anchor stitching 44; alternatively, separate stitching can be used for this purpose. In opening the bulk bag closure, after closure tube 28 has been opened, it is a simple matter to deflect flap 52 out of the way and thus provide access to discharge tube 36 (and the liner tube 50). In closing operations, flap 52 is moved up to the position shown in FIG. 3 immediately prior to the tightening of drawstring 34 to close the closure tube 28. It is thus seen that flap 52 can provide an effective supplemental dust cover but does not interfere with opening and closing operations.

It is not essential that the fold edge 42 of the continuous tube constituting tubes 28 and 32 be sewn to the lower edge of support ring 60 in the precise manner shown in FIG. 2. The lower edge of ring 60 can be wrapped around fold edge 42 if desired. Other modifications in the sewing arrangements will also be apparent and can be used. However, it is desirable that the effective closure tube length L2+L3 (FIG. 2) be no greater than D/2 ; preferably, it is slightly smaller than D/2. Furthermore, L1 should be substantially larger than L2; if it is not, it may be difficult to get all of discharge tube 36 into the interior of the bulk bag.

The following dimensions are typical:

| | |
|---|---|
| D | 15 inches (40 cm) |
| L1 | 17.5 inches (43 cm) |
| L2 | 4.5 inches (12.5 cm) |
| L3 | 2 inches (5 cm) |

However, all of these dimensions are subject to change to meet the requirements of varying bags and the materials being transported.

Figure 4:
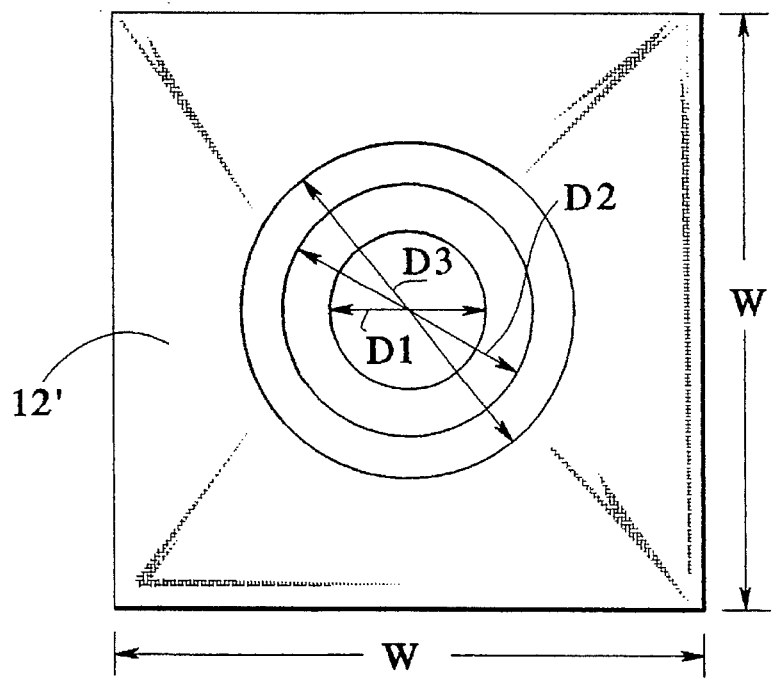
FIG. 4 shows the bottom wall of a bulk bag, used to explain the advantages of the invention.

FIG. 4 is a bottom view of a bulk bag, provided to explain the bulk bag constructions in which the invention is most advantageous. The usual bulk bag bottom 12' has a square configuration with a side dimension W. In many bulk bags W is approximately thirty-five inches (90 cm) but some larger bulk bags have a side dimension W of about forty-two inches (107 cm). These are the-fabric widths; in the finished bag W is slightly smaller due to the sewing which affixes the bulk bag bottom wall 12' to the wall structure of the bag. The finished width of the bulk bag depends to some extent on the skill and consistency of the operator making the bag, and on other like factors.

In FIG. 4 there are three outlet openings shown, with increasingly larger effective diameters D1, D2 and D3. D1 is ten inches (25 cm); there is minimal likelihood that an outlet opening this small will adversely affect the capability of a finished bulk bag to pass the 5:1 test referred to above. If the size of the outlet opening is increased so that D2 is fifteen inches (40 cm), however, the bulk bag may not be capable of surviving the 5:1 test. The improved outlet closure of the invention may be both advantageous and desirable, depending on the fabric of bottom wall 12'. With known bulk bag fabrics, any bottom wall with an outlet opening having a diameter D3 of twenty inches (51 cm) or more is strong enough to pass the 5:1 test with previously known outlet closure constructions. With the outlet closure of the invention, the desired test result can be achieved.

Figure 5:
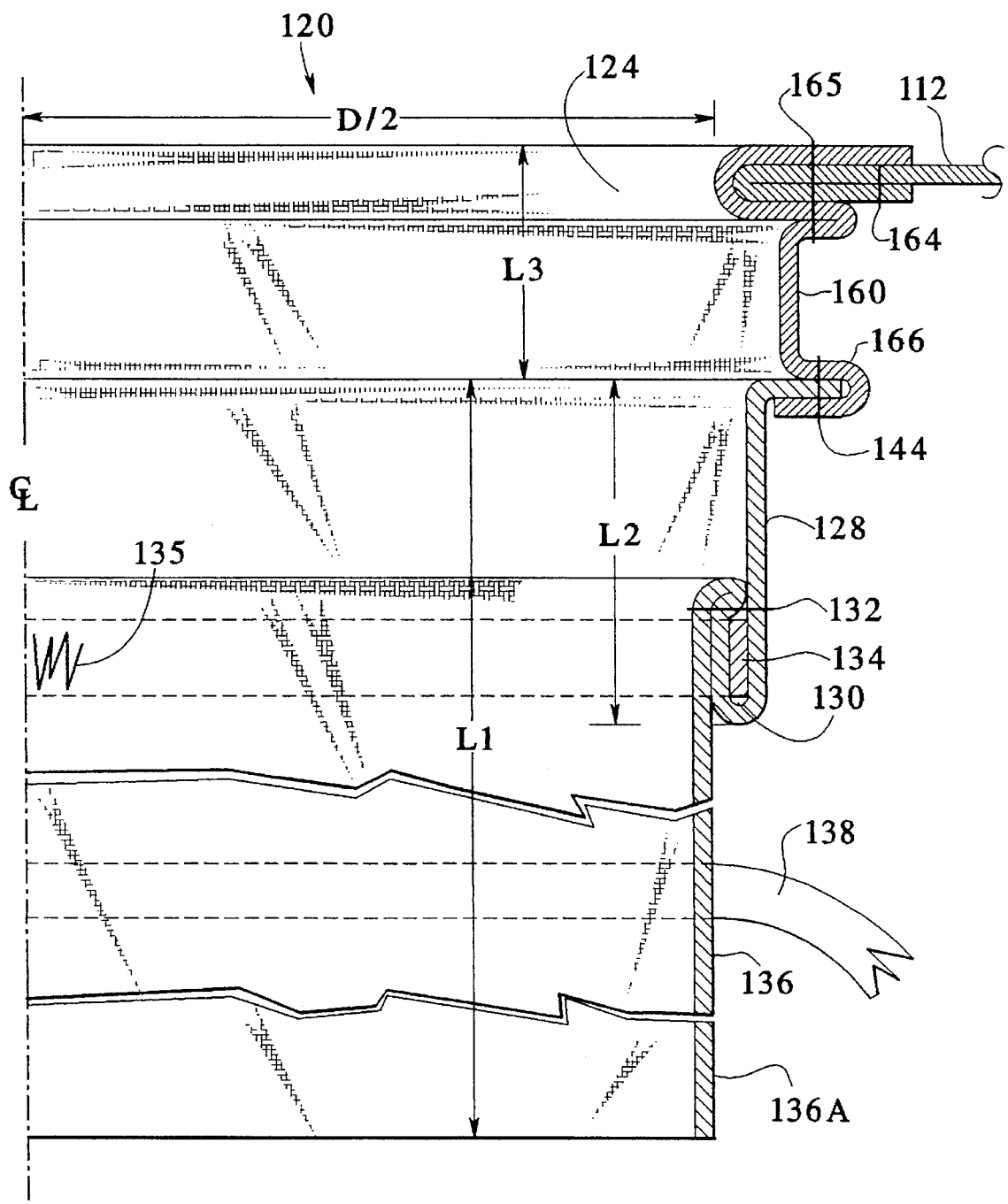
FIG. 5 illustrates a modification of the invention in a partial sectional view of a bulk bag similar to FIG. 2.

FIG. 5 illustrates a part of a bulk bag bottom wall closure 120, in a view generally similar to the right-hand half of FIG.. 2. Closure 120 starts with a discharge opening 124 in the bottom wall 112 of a bulk bag; opening 124 is cut into the central portion of the bottom bag wall. Bottom wall 112 is folded over; a retaining seam 164 holds the fold in place. Next comes a strong webbing support and reinforcement ring 160 of length L3, with its upper edge folded over the edge of discharge opening 124 in the bulk bag bottom wall 112 and sewn in place by stitching 165. The lower edge portion 166 of ring 160 is folded over and stitched, at 144, to the upper rim or edge portion of a closure tube 128 of effective length L2.

There is no separate discharge tube in the construction shown in FIG. 5. Closure tube 128 is doubled back to afford a peripheral pocket 130 secured by stitching 132. A closure drawstring 134 is positioned in pocket 130 and may be retained in pocket 130 by tack stitching 135. Below pocket 130, the tubing continues downwardly as discharge tube 136, terminating in the lower rim or edge portion 136A. A tie 138 may be provided, tacked to discharge tube 136 below pocket 130. The overall effective discharge tube length is L1; L1 is larger than L2, preferably several times larger. As before, L2+L3 should be less than D/2. Closing and opening of closure 120 of FIG. 5 is the same as closure 20 of FIGS. 2 and 3, and need not be repeated. Of course, the structure of the closure apart from support ring 60 (FIGS. 2, 3) or 160 (FIG. 5) may be changed markedly; it is the strong webbing support ring that characterizes the present invention.

I claim:

1. In a bulk bag including a bottom wall having an outlet opening of effective diameter D, joined at the periphery of the bottom wall to a side wall structure, the walls of the bulk bag all being formed of strong, flexible woven fabric having a given tensile strength, an improved discharge closure construction comprising:

a support ring of strong, heavy webbing, having a tensile strength at least twice the tensile strength of the woven fabric of the bulk bag walls and having a diameter at least as large as D, the support ring having an effective length L3, one end edge of the support ring being anchored to the periphery of the outlet opening in the bottom wall of the bag;

and a bottom wall closure including a flexible discharge tube having a diameter at least as large as D and having an effective length L1 larger than L3, the discharge tube having an upper end edge secured to the lower periphery of the support ring, the discharge tube projecting downwardly from the support ring when the bottom wall closure is open.

2. An improved discharge closure construction for a bulk bag, according to claim 1, in which:

D>fifteen inches (40 cm);

L1>ten inches (25 cm); and

L3>two inches (5 cm).

3. An improved discharge closure construction for a bulk bag, according to claim 1, in which the webbing support ring is stitched to the periphery of the outlet opening.

4. An improved discharge closure construction for a bulk bag, according to claim 1, in which the discharge tube is stitched to the periphery of the support ring.

5. In a bulk bag including a bottom wall having an outlet opening of effective diameter D, joined at the periphery of the bottom wall to a side wall structure, the walls of the bulk bag all being formed of strong, flexible woven fabric, an improved discharge closure construction comprising:

a long discharge tube of a strong, flexible, woven fabric having a diameter at least as large as D and having an effective length L1;

a closure tube of a strong, flexible, woven fabric having a diameter at least as large as D and having an effective length L2; and a support ring of strong, heavy webbing, having a tensile strength at least twice the tensile strengths of the discharge tube and of the closure tube, and having a diameter at least as large as D, the support ring having an effective length L3;

L2+L3 being no greater than D/2 and L1 being greater than L2;

the discharge tube and the closure tube each having an upper end edge secured to the lower periphery of the support ring, the discharge tube and the closure tube both projecting downwardly from the support ring.

6. An improved discharge closure construction for a bulk bag, according to claim 5, in which the discharge tube is disposed within the closure tube.

7. An improved discharge closure for a bulk bag, according to claim 5, in which the bulk bag end wall, the discharge tube, and the closure tube are all formed of a strong, flexible woven fabric of resin tape.

8. An improved discharge closure construction for a bulk bag, according to claim 5, and further comprising:

a supplemental closure member, having a diameter approximately equal to D, attached to the upper edge of the support ring at a point adjacent to the periphery of the end wall opening, the supplemental closure member extending across the support ring to afford a dust cover when the closure is closed.

9. An improved discharge closure construction for a bulk bag, according to claim 5, in which:

D>fifteen inches (40 cm);

L1>ten inches (25 cm);

L2>4.5 inches (12.5 cm); and

L3>two inches (5 cm).

* * * * *